(12) United States Patent
Takeuchi et al.

(10) Patent No.: US 6,757,111 B2
(45) Date of Patent: Jun. 29, 2004

(54) ZOOM LENS

(75) Inventors: Hotaka Takeuchi, Tokyo (JP); Yasuhiko Abe, Tokyo (JP)

(73) Assignee: Nidec Copal Corporation, Tokyo (JP)

( * ) Notice: Subject to any disclaimer, the term of this patent is extended or adjusted under 35 U.S.C. 154(b) by 0 days.

(21) Appl. No.: 10/279,665

(22) Filed: Oct. 24, 2002

(65) Prior Publication Data

US 2003/0099043 A1 May 29, 2003

(30) Foreign Application Priority Data

Oct. 30, 2001 (JP) .................................. 2001-333198

(51) Int. Cl.[7] .............................. G02B 9/12; G02B 15/14
(52) U.S. Cl. .................... 359/784; 359/689; 359/680; 359/682
(58) Field of Search .......................... 359/687, 689, 359/782, 780, 781, 783, 686, 680, 681, 682, 784, 786, 787, 788

(56) References Cited

U.S. PATENT DOCUMENTS

| 4,153,339 A | * | 5/1979 | Tajima et al. ............ 359/681 |
| 4,465,343 A | * | 8/1984 | Horimoto .................. 359/680 |
| 5,434,710 A | | 7/1995 | Zozawa ...................... 359/689 |
| 6,308,011 B1 | | 10/2001 | Wachi et al. .............. 396/72 |
| 6,414,799 B1 | * | 7/2002 | Uzawa et al. ............. 359/687 |
| 6,545,819 B1 | * | 4/2003 | Nanba et al. .............. 359/689 |

FOREIGN PATENT DOCUMENTS

| JP | 5-173073 | 7/1993 | .......... G02B/15/20 |
| JP | 6-201993 | 7/1994 | .......... G02B/15/00 |

* cited by examiner

Primary Examiner—Tim Thompson
(74) Attorney, Agent, or Firm—Darby & Darby

(57) ABSTRACT

A zoom lens with a slim and compact design has arranged in sequence from the object side to the image plane side a first lens group having a negative refractive power, a second lens group having a positive refractive power, and a third lens group having a positive refractive power. The first lens group is formed from a first lens having a negative refractive power and a second lens having a positive refractive power. The second lens group is formed from a third lens having a positive refractive power and a fourth lens and a fifth lens. The fourth and fifth lens are joined together and have a negative refractive power. The third lens group is formed from a sixth lens having a positive refractive power. The zoom lens has a short length when retracted and extended, and a design that is compact and thin.

5 Claims, 16 Drawing Sheets

ZOOM LENS

BACKGROUND OF THE INVENTION

The present invention relates to a compact zoom lens for use in digital still cameras, video cameras, and other devices that are equipped with an imaging element having a high pixel count such as a CCD.

Japanese Laid-Open Patent Publication Number Hei 5-173073 and Japanese Laid-Open Patent Publication Number Hei 6-201993 disclose conventional zoom lenses that include a first lens group with a negative refractive power; a second lens group with a positive refractive power; and a third lens group with a positive refractive power. The three lens groups include at least seven lenses arranged along an optical axis.

In recent years, there have been significant developments in the technology of solid-state imaging elements such as CCD's that are used in devices such as digital still cameras and video cameras. The increase in the density and number of pixels in these devices has led to a growing need for lenses for optical systems with superior optical characteristics. However, as devices such as digital still cameras and video cameras decrease in size, the zoom lenses mounted on these devices must become more compact, thinner, and lighter. Compactness, especially in terms of the length of the lens, is particularly important when the zoom lens is mounted on the main camera unit regardless of whether the camera is in use.

A conventional zoom lens uses at least seven lenses which requires that the zoom lens has a significant length along its optical axis. As a result, conventional zoom lenses do not meet the demands of more compact, thinner digital still cameras, video cameras, and the like.

SUMMARY OF THE INVENTION

The present invention provides a zoom lens having a compact, light, and thin design with superior optical characteristics that efficiently correct various aberrations. The zoom lens is used particularly for imaging elements with high pixel counts, wherein the zoom factor is approximately 3 and the following conditions are met: the total lens length during shooting is no more than 37 mm; the total thickness along the optical axis of the lens groups is no more than 15 mm; the back focus for placement of a low-pass filter and the like is at least 3 mm; the lens brightness (F number) at the wide-angle end is approximately 2.8; and the distortion is no more than 5%.

The zoom lens includes, from the object side to the image plane side: a first lens group having a negative overall refractive index, a second lens group having a positive overall refractive index, and a third lens group having a positive overall refractive index. The first lens group is formed from a first lens having a negative refractive power and a second lens having a positive refractive power. The second lens group is formed from a third lens, a fourth lens and a fifth lens. The third lens has a positive refractive power. The fourth and fifth lenses are joined together and have a negative refractive power. The third lens group is formed from a sixth lens having a positive refractive power.

With this structure, the total system can be formed with six lenses. Therefore, the total length and the retracted size of the zoom lens are reduced, and it is compact and thin.

The zoom lens as described above can satisfy the following conditions (1) and (2):

$$0.5 < f2/|f1| < 1.2 \quad (1)$$

$$1.5 < f3/fw < 6 \quad (2)$$

where fi (i=1–3) is the focal distance of the i-th lens group and fw is the focal distance of the total lens system at the wide-angle end. Distortion, lateral chromatic aberration, and the like are corrected, and the zoom lens is telecentric and compact. Other optical characteristics are also improved with this construction.

The zoom lens as described above can also satisfy the following conditions (3) and (4):

$$v1 - v2 > 10 \quad (3)$$

$$D2/fw > 0.2 \quad (4)$$

where v1 is the Abbe number of the first lens, v2 is the Abbe number of the second lens, D2 is the distance between the first lens and the second lens along the optical axis, and fw is the focal distance of the total lens system at the wide-angle end. Spherical aberration, astigmatism, distortion, and the like are corrected when these conditions are satisfied. This configuration is particularly effective for correcting chromatic aberration.

The first, third, and sixth lenses can include aspherical surfaces to correct aberrations such as spherical aberration, coma, and the like.

The aspherical surface of the first lens can be formed at the end having a smaller curvature radius or can be formed with a diminishing refractive index toward the periphery. These modifications can correct distortion.

The first lens group, the second lens group, and the third lens group can move along the optical axis during the zooming and image plane correction operations performed from the wide-angle end to the telescopic end. This structure allows for the correction of different types of aberrations at the central focal distance at a central position between the wide-angle end and the telescopic end.

The third lens group can move along the optical axis toward the image plane side and then toward the object side during the zooming and image plane correction operations performed from the wide-angle end to the telescopic end. This structure allows for the correction of astigmatism at the central focal distance at a central position between the wide-angle end and the telescopic end.

The features and advantages of the present invention will become apparent from the following description with reference to the accompanying drawings.

DETAILED DESCRIPTION OF THE PREFERRED EMBODIMENTS

Figure 1:
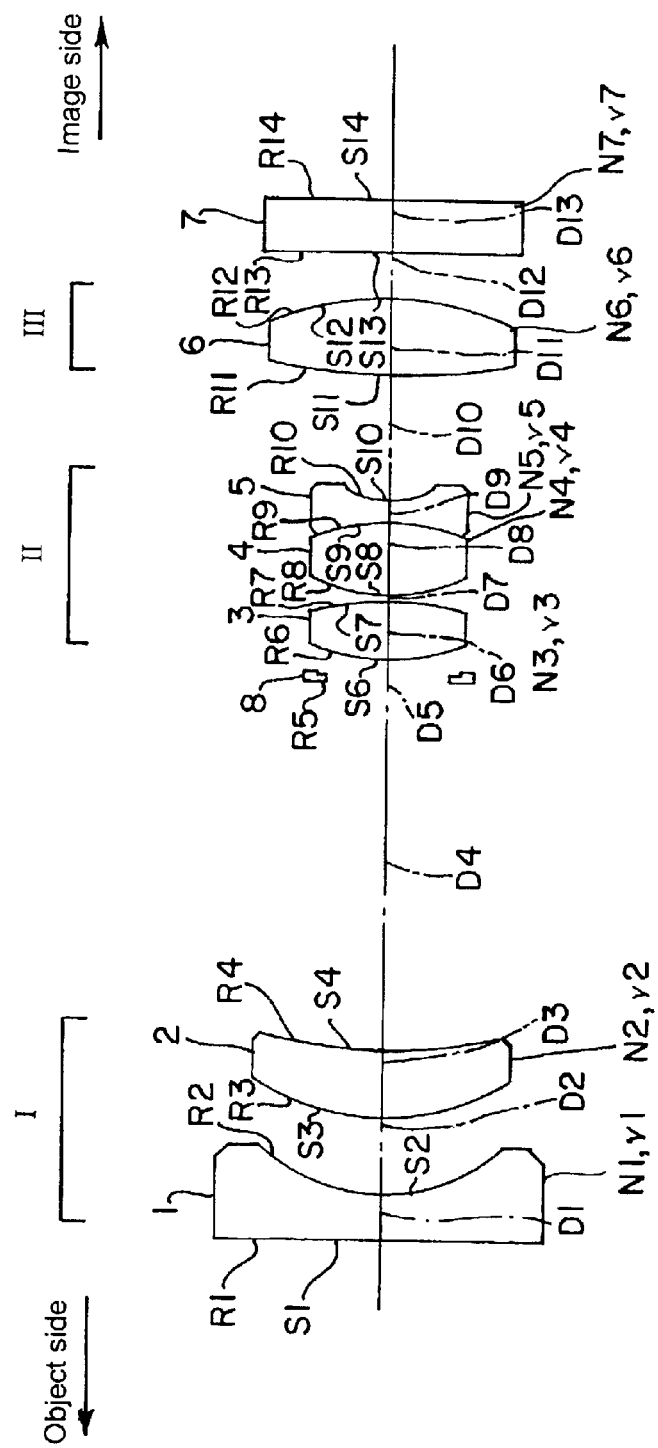
FIG. 1 illustrates a zoom lens according to the present invention.

FIG. 1 illustrates the basic structure of a zoom lens according to the present invention. From the object end to the image plane end, the zoom lens includes a first lens group I having a negative overall refractive index, a second lens group II having an positive overall refractive index, and a third lens group III having an positive overall refractive index.

The first lens group I is formed from a first lens 1 having a negative refractive power and a second lens 2 having a positive refractive power. The second lens group II is formed from a third lens 3, a fourth lens 4, and a fifth lens 5. The third lens 3 has a positive refractive power. The fourth lens 4 and the fifth lens 5 are joined together and have a negative refractive power. The third lens group III is formed from a sixth lens 6 having a positive refractive power.

A glass filter 7, such as an infrared cut filter or a low-pass filter, is positioned on the image plane side of the third lens group III which comprises the sixth lens 6. An aperture stop 8 is disposed between the second lens group II and the third lens group III, i.e., the second lens 2 and the third lens 3.

The first lens group I, the second lens group II, and the third lens group III can move independently along the optical axis X. Therefore, the zoom factor can be adjusted from the wide-angle to the telescopic end, and the image plane can be corrected accordingly. By adjusting the zoom scale from the wide-angle to the telescopic end, the third lens group III moves toward the image plane side and then toward the object side.

The composite focal distance of the first lens group I is represented by f1, the composite focal distance of the second lens group II is represented by f2, the focal distance of the lens system at the wide-angle end is represented by fw, the focal distance of the lens system at the telescopic end is represented by ft, and the focal distance of the lens system at the central region is represented by fm. The lens surfaces of the first lens 1 through the sixth lens 6 are represented by Si (i=1–4, 6–12); the respective curvature radii of the surfaces Si are represented by Ri (i=1–4, 6–12); the refractive index of the i-th lens relative to line d is represented by Ni (i=1–6); and the Abbe number is represented by vi (i=1–6).

For the glass filter 7, the surfaces are represented by Si (i=13, 14), the curvature radii of the surfaces Si are represented by Ri (i=13, 14), the refractive index relative to line d is represented by N7, and the Abbe number is represented by v7. The thickness of the individual lenses and the distances between each of the elements along the optical axis X from the first lens 1 to the glass filter 7 are represented by Di (i=1–13) as shown in FIG. 1.

The fourth lens 4 and the fifth lens 5, which comprise the second lens group II, are joined together at the surface S9 where the lenses have matching curvature radii R9. If the fourth lens 4 and the fifth lens 5 were replaced by a single lens, the resulting color aberration would be difficult to correct and would affect high resolution imaging. Additionally, automatic centering would be difficult due to the exact similarity between the curvature radii of the two sides of the lens. By separately preparing and then joining the fourth lens 4 and the fifth lens 5, color aberration can be corrected. Furthermore, the lenses can be centered separately.

Since the image-side surface S2 of the first lens 1 has a smaller curvature radius than the object-side surface S1 of the first lens 1, surface S2 is aspherical. The negative refractive power of this aspherical surface decreases toward the periphery in order to correct distortion. Similarly, the object-side surface 56 of the third lens 3 is aspherical in order to correct spherical aberration. Furthermore, the image-side surface S12 of the sixth lens 6 is aspherical in order to correct coma.

Thus, the correction of various types of aberration can be accomplished by using aspherical surfaces for the first lens 1 having a negative refractive power, the third lens 3 having a positive refractive power, and the sixth lens 6 having a positive refractive power.

The aspherical surfaces are defined by the following equation:

$$Z=Cy^2/[1+(1-\epsilon C^2 y^2)^{1/2}]+Dy^4+Ey^6+Fy^8+G$$

where Z is the distance from the tangent plane at the apex of the aspherical surface to a point on the aspherical surface; y is the height from the optical axis X; C is the curvature (1/R)

at the apex of the aspherical surface; $\epsilon$ is the conic constant; and D, E, F, and G are the aspherical surface coefficients.

The first, second, and third lens groups are constructed to satisfy the following:

$$0.5 < f2/|f1| < 1.2 \quad (1)$$

$$1.5 < f3/fw < 6 \quad (2)$$

where f1, f2, and f3 are the focal distances of the first, second, and third lens groups respectively and fw is the focal distance of the lens system at the wide-angle end.

Condition (1) defines the appropriate ratio between the focal distances of the first lens group I and the second lens group II. If the upper limit is exceeded, correction becomes difficult, especially for distortion and lateral chromatic aberration. Dropping below the lower limit makes it difficult to achieve a zoom ratio of approximately 3. By satisfying condition (1), a zoom ratio of approximately 3 can be achieved with good optical characteristics and a compact design.

Condition (2) defines the appropriate focal distance for the third lens group III. If the upper limit is exceeded, the exit pupil position approaches the image plane, making telecentricity difficult to obtain. Dropping below the lower limit makes it difficult to provide a compact overall design for the zoom lens. Thus, by satisfying the condition (2), a compact design can be achieved while maintaining telecentricity and resulting in a zoom lens suitable for imaging elements with high pixel counts.

The first lens group I is prepared to satisfy the following conditions:

$$v1 - v2 > 10 \quad (3)$$

$$D2/fw > 0.2 \quad (4)$$

where v1 is the Abbe number of the first lens 1, v2 is the Abbe number of the second lens 2, D2 is the distance between the first lens 1 and the second lens 2 along the optical axis X, and fw is the focal distance for the entire lens system at the wide-angle end.

By satisfying condition (3), the zoom lens provides effective correction, especially for chromatic aberration.

By satisfying condition (4), the zoom lens provides effective correction of various aberrations such as spherical aberration.

Table 1 shows the numerical specifications for the zoom lens of a first embodiment under the conditions (1), (2), (3), and (4), such that f2/|f1|=0.803, f3/fw=2.371, v1−v2=20.0, and D2/fw=0.498. Table 2 shows the numerical data for the individual lens surfaces. Table 3 shows the numerical data relating to the aspherical surfaces S2, S6, and S12. Table 4 shows the focal distances for the lens system at the wide-angle end fw, the central position fm, and the telescopic end ft and the distances D4, D10, and D12 along the optical axis X.

Figure 2:
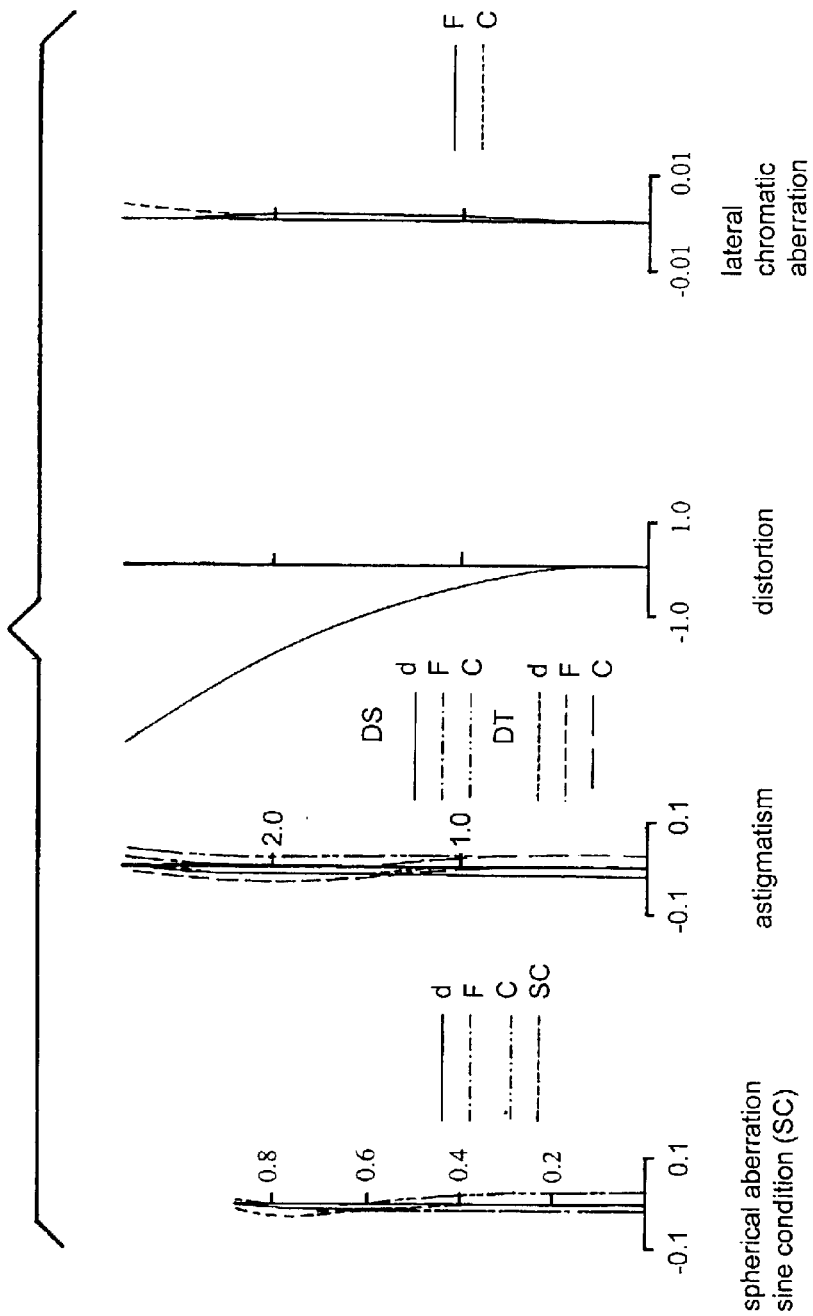
FIG. 2 illustrates spherical aberration, astigmatism, distortion, and lateral chromatic aberration at the wide-angle end of a zoom lens according to an embodiment of the present invention.
Figure 3:
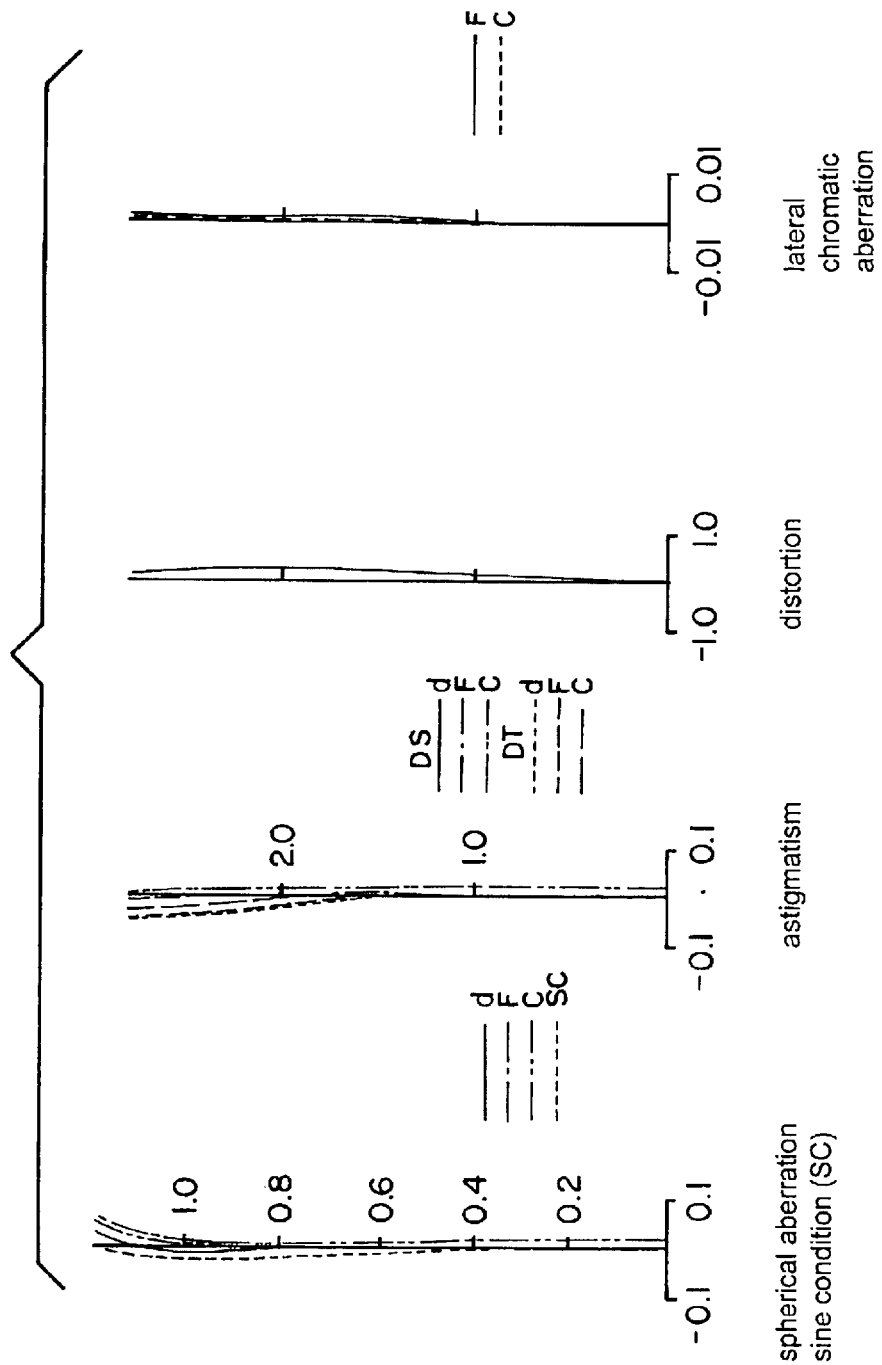
FIG. 3 illustrates spherical aberration, astigmatism, distortion, and lateral chromatic aberration at the central position of a zoom lens according to an embodiment of the present invention.
Figure 4:
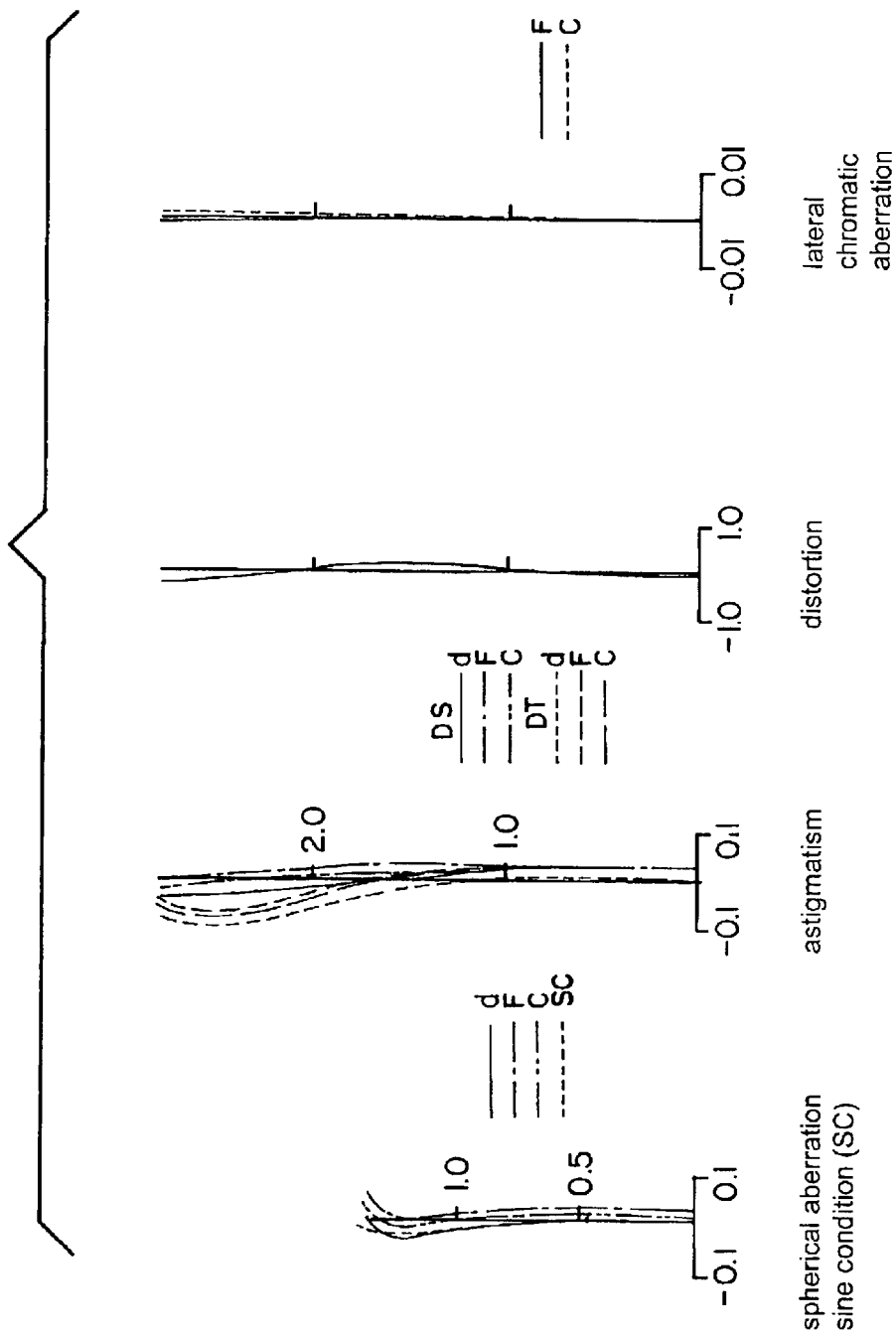
FIG. 4 illustrates spherical aberration, astigmatism, distortion, and lateral chromatic aberration at the telescopic end of a zoom lens according to an embodiment of the present invention.

FIGS. 2–4 are aberration line drawings indicating spherical aberration, astigmatism, distortion, and lateral chromatic aberration. In FIGS. 2–4, 6–8, 10–12, and 14–16, d represents the aberration due to line d, F represents aberration due to line F, c represents aberration due to line c, SC represents the offense against the sine condition, DS represents sagittal plane aberration, and DT represents meridional plane aberration.

TABLE 1

| | | | |
|---|---|---|---|
| Object distance (mm) | ∞ | Thickness of third lens group III (mm) | 2.50 |
| Focal distance (mm) | 5.02 9.84 14.50 | Total thickness of all lens groups (mm) | 14.20 |
| F number | 2.84 4.13 5.31 | Back focus (air conversion) (mm) | 3.467 3.267 3.467 |
| Exit pupil position (mm) | −23.35 +106.96 +28.43 | Angle of view (2ω) | 60.2° 31.7° 21.9° |
| Total lens length (mm) | 30.20 28.79 31.54 | Focal distance f1 (mm) | −12.048 |
| Total lens system length (mm) | 34.25 32.64 35.58 | Focal distance f2 (mm) | 9.680 |
| Thickness of first lens group I (mm) | 6.05 | Focal distance f3 (mm) | 11.904 |
| Thickness of second lens group II (mm) | 5.65 (includes iris) | Focal distance of the lens system at the wide-angle end fw (mm) | 5.02 |

TABLE 2

| Surface | Curvature radius (mm) | Distance (mm) | Refractive Index (d line) | Abbe number |
|---|---|---|---|---|
| S1 | R1: 104.066 | D1: 1.500 | N1: 1.80432 | v1: 40.9 |
| S2* | R2: 5.331 | | | |
| | | D2: 2.500 | | |
| S3 | R3: 9.019 | D3: 2.050 | N2: 1.92286 | v2: 20.9 |
| S4 | R4: 15.838 | | | |
| | | D4: variable | | |
| S5 | Aperture stop | | | |
| | | D5: 0.600 | | |
| S6* | R6: 8.187 | D6: 1.800 | N3: 1.51450 | v3: 63.1 |
| S7 | R7: −16.300 | | | |
| | | D7: 0.200 | | |
| S8 | R8: 5.422 | D8: 2.250 | N4: 1.78590 | v4: 43.9 |
| S9 | R9: −8.995 | D9: 0.800 | N5: 1.72825 | v5: 28.3 |
| S10 | R10: 3.049 | | | |
| | | D10: variable | | |
| S11 | R11: 21.331 | D11: 2.500 | N6: 1.58323 | v6: 59.5 |
| S12* | R12: −9.849 | | | |
| | | D12: variable | | |
| S13 | R13: ∞ | D13: 1.700 | N7: 1.51680 | v7: 64.2 |
| S14 | R14: ∞ | | | |

* Aspherical surface

TABLE 3

| Aspherical surface coefficient | Numerical Data |
|---|---|
| | Surface S2 |
| $\epsilon$ | 0.3580000 |
| D | $0.9228168 \times 10^{-4}$ |
| E | $-0.3438605 \times 10^{-5}$ |
| F | $0.3772979 \times 10^{-6}$ |
| G | $-0.1120333 \times 10^{-7}$ |
| | Surface S6 |
| $\epsilon$ | −0.9500000 |
| D | $-0.6632119 \times 10^{-4}$ |
| E | $-0.1910034 \times 10^{-4}$ |
| F | $0.4364795 \times 10^{-5}$ |
| G | $-0.4848686 \times 10^{-6}$ |

TABLE 3-continued

| Aspherical surface coefficient | Numerical Data |
|---|---|
| | Surface S12 |
| ε | −2.7500000 |
| D | −0.1259369 × 10$^{-4}$ |
| E | −0.9450508 × 10$^{-5}$ |
| F | −0.3946424 × 10$^{-6}$ |
| G | 0.4700000 × 10$^{-7}$ |

TABLE 4

| | Wide-Angle End | Central Position | Telescopic End |
|---|---|---|---|
| f (mm) | 5.02 (fw) | 9.84 (fm) | 14.50 (ft) |
| D4 (mm) | 12.000 | 4.628 | 1.894 |
| D10 (mm) | 4.000 | 9.965 | 15.443 |
| D12 (mm) | 1.346 | 1.146 | 1.346 |

For the wide-angle, central, and telescopic positions of the lens system, the total lens length (from the front surface S1 of the first lens 1 to the back surface S12 of the sixth lens 6) is 30.20 mm, 28.79 mm, and 31.54 mm; the total lens system length (from the front surface S1 of the first lens 1 to the image plane, including the cover glass of the CCD) is 34.25 mm, 32.64 mm, and 35.58 mm; the back focus (air conversion) is 3.467 mm, 3.267 mm, and 3.467 mm; the exit pupil position is −23.35 mm, +106.96 mm, and +28.43 mm; and the F number is 2.84, 4.13, and 5.31.

Figure 5:
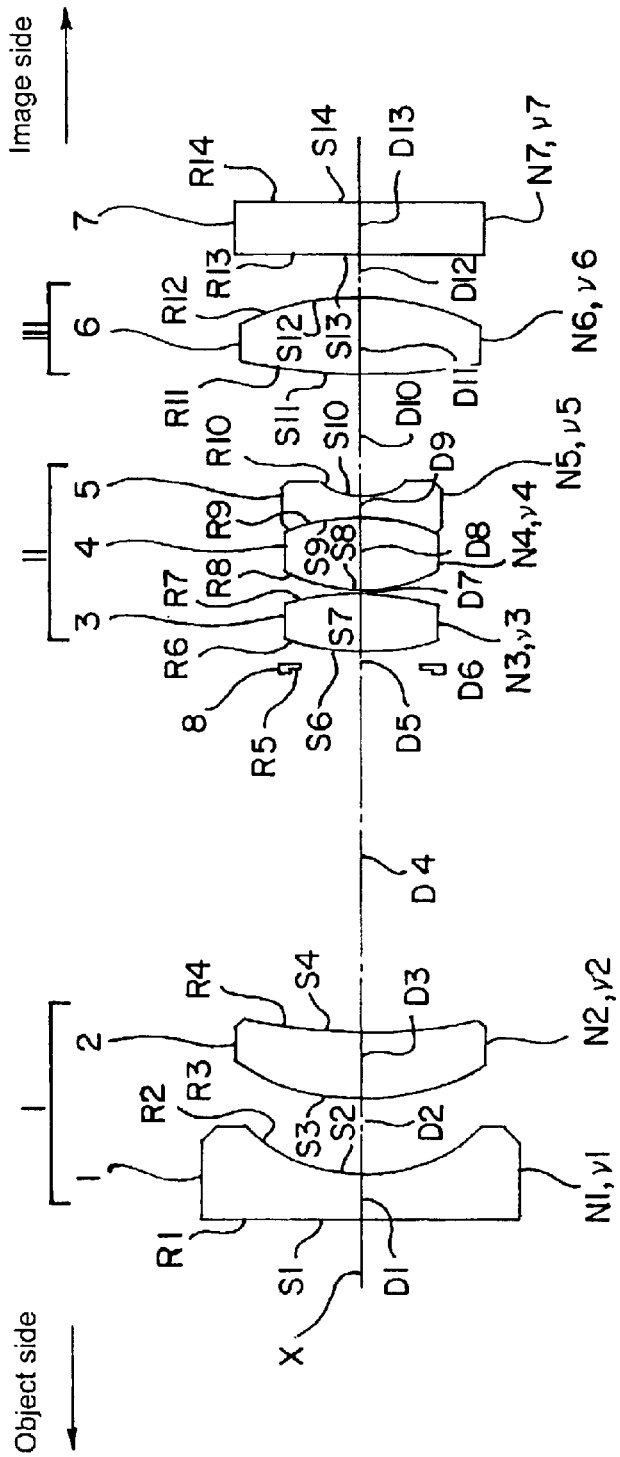
FIG. 5 illustrates an embodiment of a zoom lens according to the present invention.

FIG. 5 shows the basic structure of a second embodiment of the zoom lens. The structure of this zoom lens is identical to the structure of the first embodiment described above except for the different lens specifications.

Table 5 shows the lens specifications for a second embodiment under the conditions (1), (2), (3), and (4), such that f2/|f1|=0.799, f3/fw=2.455, v1−v2=20.0, and D2/fw=0.515. Table 6 shows the numerical data for the individual lens surfaces. Table 7 shows the numerical data relating to the aspherical surfaces S2, S6, and S12. Table 8 shows the focal distances for the lens system at the wide-angle end fw, the central position fm, and the telescopic end ft and the distances D4, D10, and D12 along the optical axis X.

Figure 6:
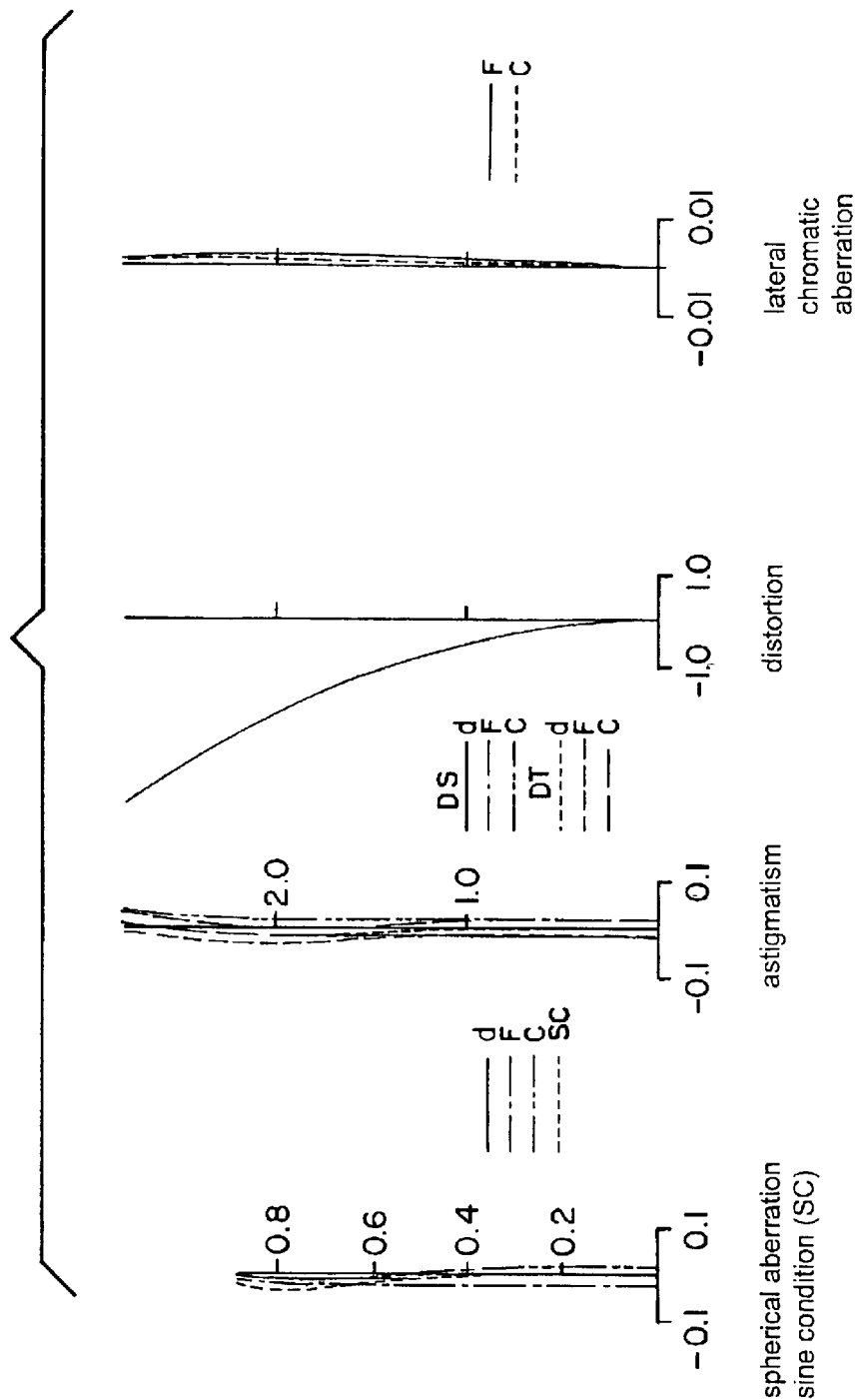
FIG. 6 illustrates spherical aberration, astigmatism, distortion, and lateral chromatic aberration at the wide-angle end of a zoom lens according to an alternate embodiment of the present invention.
Figure 7:
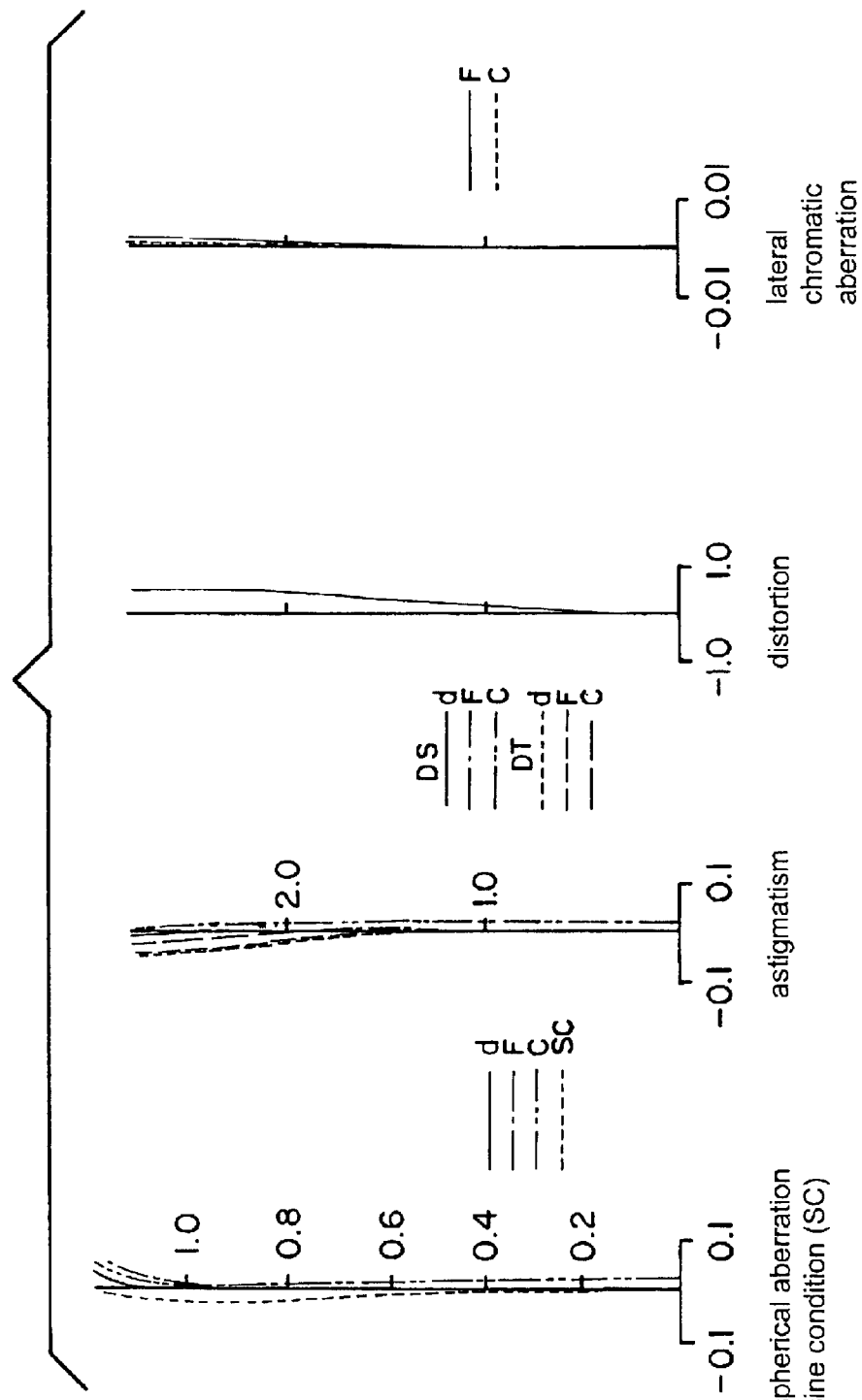
FIG. 7 illustrates spherical aberration, astigmatism, distortion, and lateral chromatic aberration at the central position of a zoom lens according to an alternate embodiment of the present invention.
Figure 8:
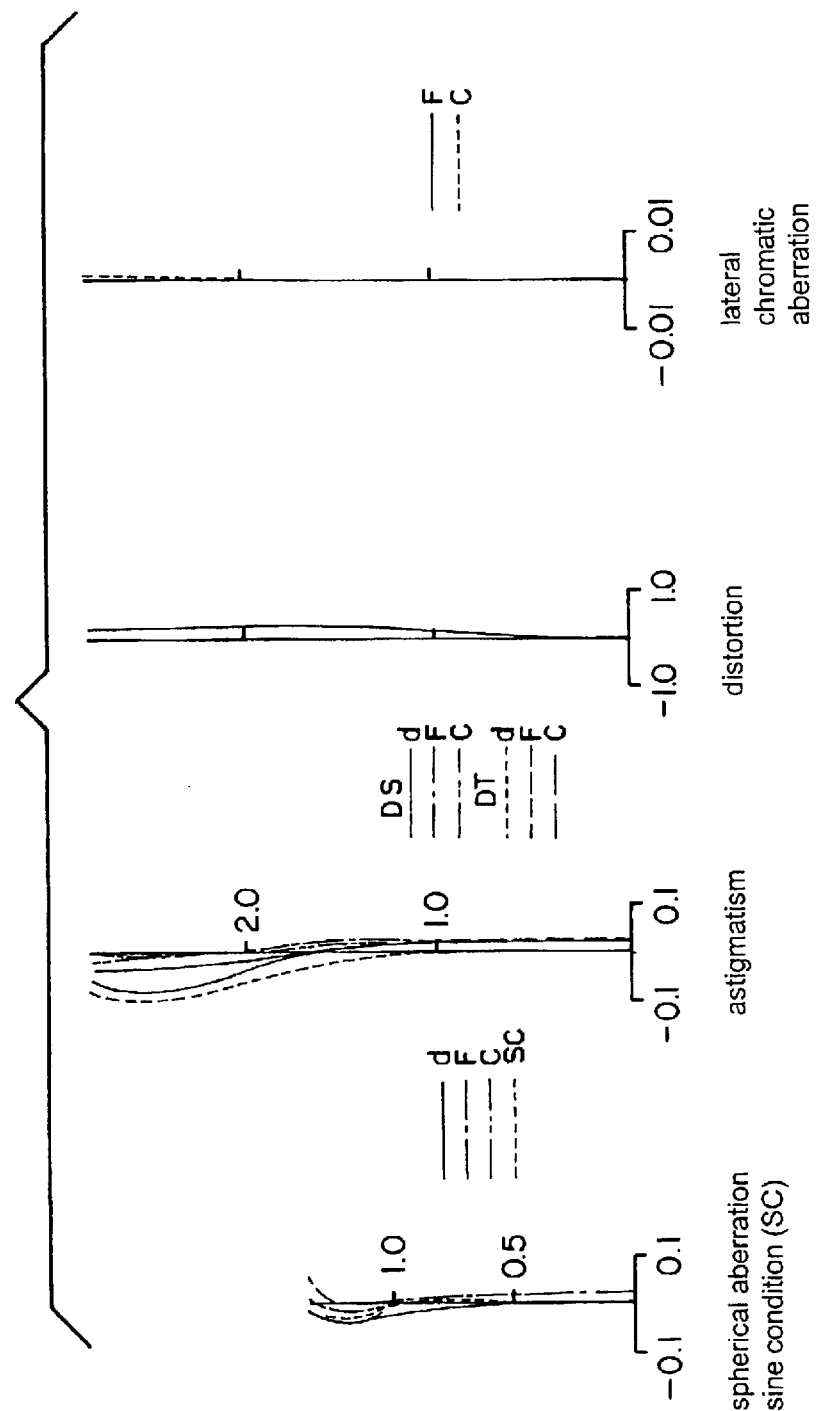
FIG. 8 illustrates spherical aberration, astigmatism, distortion, and lateral chromatic aberration at the telescopic end of a zoom lens according to an alternate embodiment of the present invention.

FIGS. 6, 7, and 8 are aberration line drawings indicating spherical aberration, astigmatism, distortion, and lateral chromatic aberration.

TABLE 5

| Object distance (mm) | ∞ | Thickness of third lens group III (mm) | 2.50 |
|---|---|---|---|
| Focal distance (mm) | 4.85 | Total thickness of all lens groups (mm) | 14.20 |
| | 9.425 | | |
| | 14.00 | | |
| F number | 2.84 | Back focus (air conversion) (mm) | 3.482 |
| | 4.08 | | 3.282 |
| | 5.25 | | 3.482 |
| Exit pupil position (mm) | −22.19 | Angle of view (2ω) | 61.9° |
| | +162.68 | | 33.0° |
| | +30.79 | | 22.6° |
| Total lens length (mm) | 30.48 | Focal distance f1 (mm) | −12.120 |
| | 28.43 | | |
| | 30.79 | | |
| Total lens system length (mm) | 34.55 | Focal distance f2 (mm) | 9.687 |
| | 32.29 | | |
| | 34.85 | | |
| Thickness of first lens group I (mm) | 6.05 | Focal distance f3 (mm) | 11.905 |
| Thickness of second lens group II (mm) | 5.65 (includes iris) | Focal distance of the lens system at the wide-angle end fw (mm) | 4.85 |

TABLE 6

| Surface | Curvature radius (mm) | Distance (mm) | Refractive Index (d line) | Abbe number |
|---|---|---|---|---|
| S1 | R1: 133.073 | D1: 1.500 | N1: 1.80432 | v1: 40.9 |
| S2* | R2: 5.265 | | | |
| | | D2: 2.500 | | |
| S3 | R3: 9.175 | D3: 2.050 | N2: 1.92286 | v2: 20.9 |
| S4 | R4: 17.230 | | | |
| | | D4: variable | | |
| S5 | Aperture stop | | | |
| | | D5: 0.600 | | |
| S6* | R6: 7.947 | D6: 1.800 | N3: 1.51450 | v3: 63.1 |
| S7 | R7: −16.294 | | | |
| | | D7: 0.200 | | |
| S8 | R8: 5.516 | D8: 2.250 | N4: 1.78590 | v4: 43.9 |
| S9 | R9: −8.243 | D9: 0.800 | N5: 1.72825 | v5: 28.3 |
| S10 | R10: 3.049 | | | |
| | | D10: variable | | |
| S11 | R11: 24.708 | D11: 2.500 | N6: 1.58323 | v6: 59.5 |
| S12* | R12: −9.297 | | | |
| | | D12: variable | | |
| S13 | R13: ∞ | D13: 1.700 | N7: 1.51680 | v7: 64.2 |
| S14 | R14: ∞ | | | |

* aspherical surface

TABLE 7

| Aspherical surface coefficient | Numerical Data |
|---|---|
| | Surface S2 |
| ε | 0.3200000 |
| D | 0.9296380 × 10$^{-4}$ |
| E | −0.3433510 × 10$^{-5}$ |
| F | 0.3767930 × 10$^{-6}$ |
| G | −0.1128770 × 10$^{-7}$ |
| | Surface S6 |
| ε | −0.9450000 |
| D | −0.6634860 × 10$^{-4}$ |
| E | −0.1909890 × 10$^{-4}$ |
| F | 0.4364860 × 10$^{-5}$ |
| G | −0.4848650 × 10$^{-6}$ |
| | Surface S12 |
| ε | −2.7000000 |
| D | −0.1259450 × 10$^{-4}$ |
| E | −0.9452220 × 10$^{-5}$ |
| F | −0.3950320 × 10$^{-6}$ |
| G | 0.4693460 × 10$^{-7}$ |

TABLE 8

| | Wide-Angle End | Central Position | Telescopic End |
|---|---|---|---|
| f (mm) | 4.850 (fw) | 9.425 (fm) | 14.000 (ft) |
| D4 (mm) | 12.514 | 4.847 | 1.910 |
| D10 (mm) | 3.770 | 9.385 | 14.681 |
| D12 (mm) | 1.361 | 1.161 | 1.361 |

For the wide-angle, central, and telescopic positions of the lens system in this second embodiment described above, the total lens length (from the front surface S1 of the first lens 1 to the back surface S12 of the sixth lens 6) is 30.48 mm, 28.43 mm, and 30.79 mm; the total lens system length (from the front surface S1 of the first lens 1 to the image plane, including the cover glass of the CCD) is 34.55 mm, 32.29 mm, and 34.85 mm; the back focus (air conversion) is 3.482 mm, 3.282 mm, and 3.482 mm; the exit pupil position is −22.19 mm, +162.68 mm, and +30.79 mm; and the F number is 2.84, 4.08, and 5.25.

Figure 9:
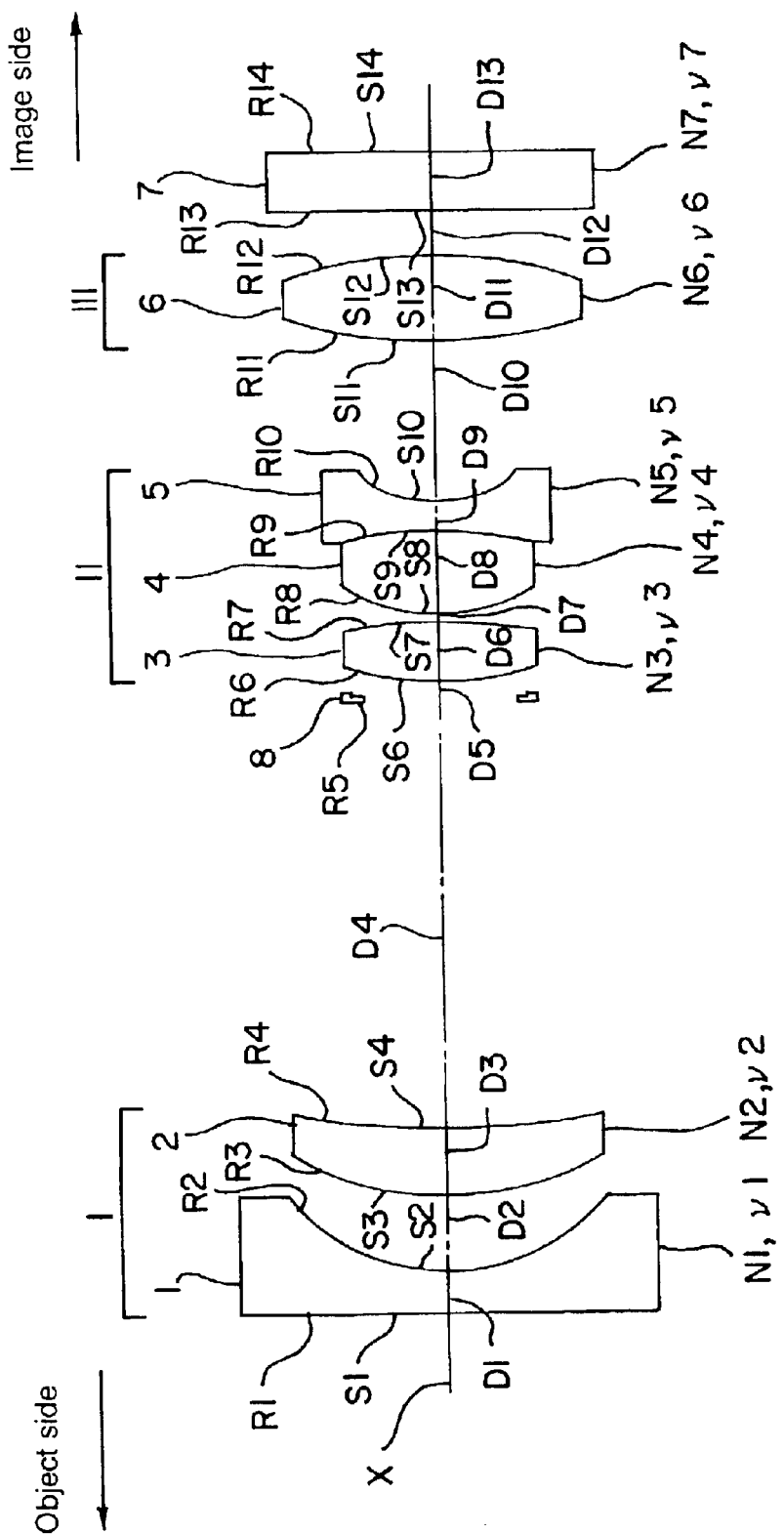
FIG. 9 illustrates an embodiment of a zoom lens according to the present invention.

FIG. 9 shows the basic structure of a third embodiment of the zoom lens. The structure of this zoom lens is identical to the embodiments described above except for the different lens specifications.

Table 9 shows the lens specifications for the third embodiment under the conditions (1), (2), (3), and (4), such that $f2/|f1|=0.754$, $f3/fw=2.390$, $v1-v2=17.100$, and $D2/fw=0.390$. Table 10 shows the numerical data for the individual lens surfaces. Table 11 shows the numerical data relating to the aspherical surfaces S2, S6, and S12. Table 12 shows the focal distances for the lens system at the wide-angle end fw, the central position fm, and the telescopic end ft and the distances D4, D10, and D12 along the optical axis X.

Figure 10:
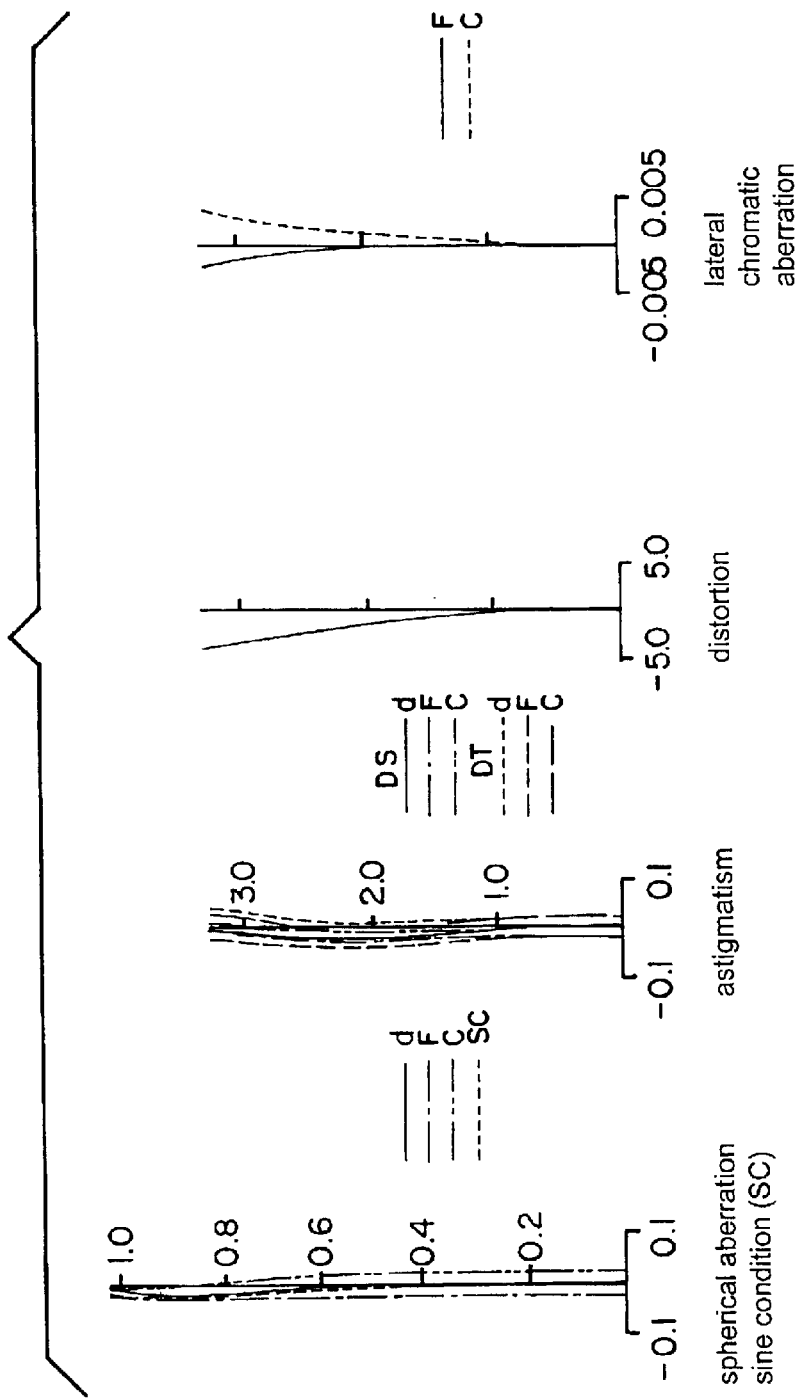
FIG. 10 illustrates spherical aberration, astigmatism, distortion, and lateral chromatic aberration at the wide-angle end of a zoom lens according to an alternate embodiment of the present invention.
Figure 11:
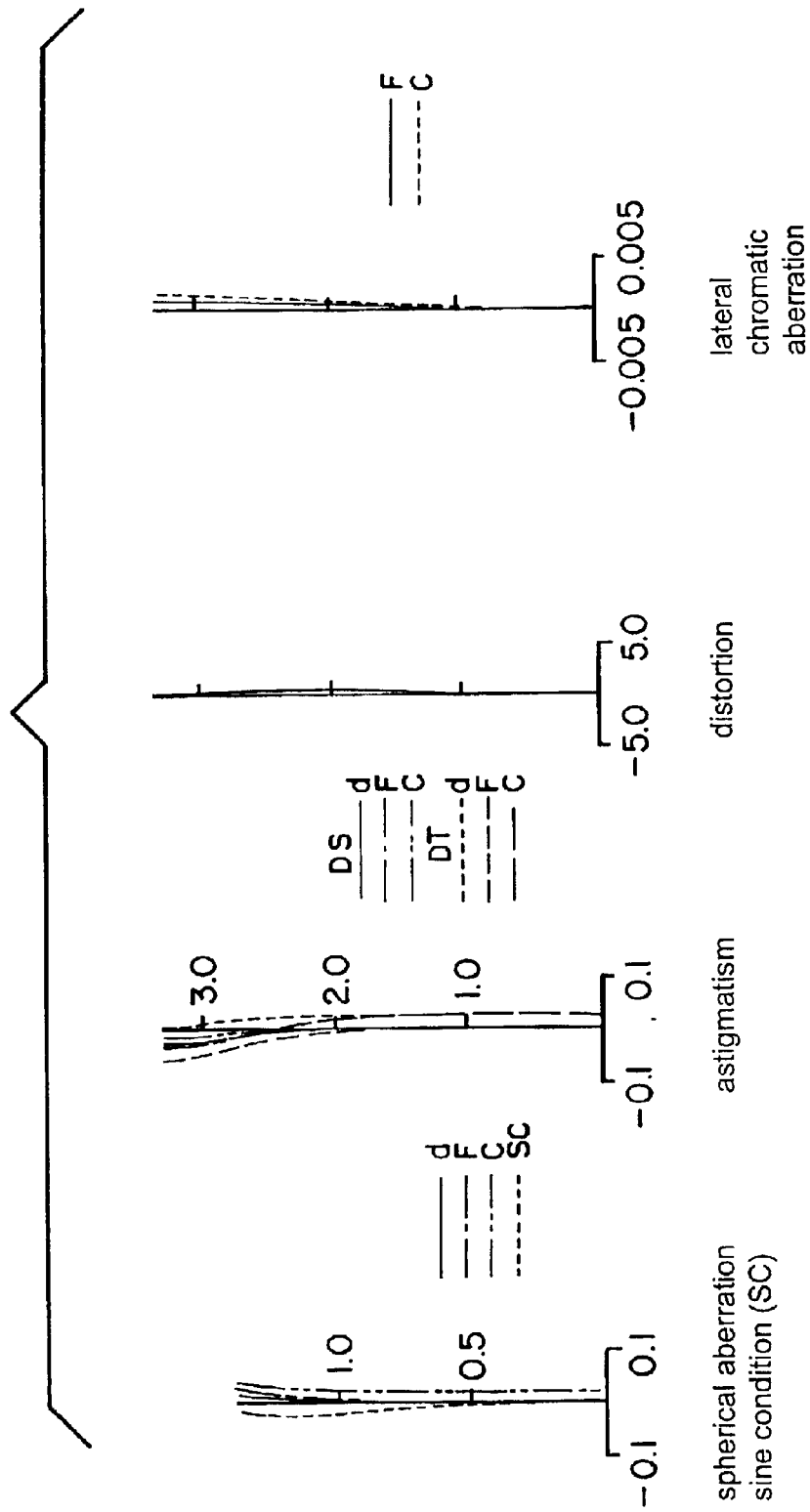
FIG. 11 illustrates spherical aberration, astigmatism, distortion, and lateral chromatic aberration at the central position of a zoom lens according to an alternate embodiment of the present invention.
Figure 12:
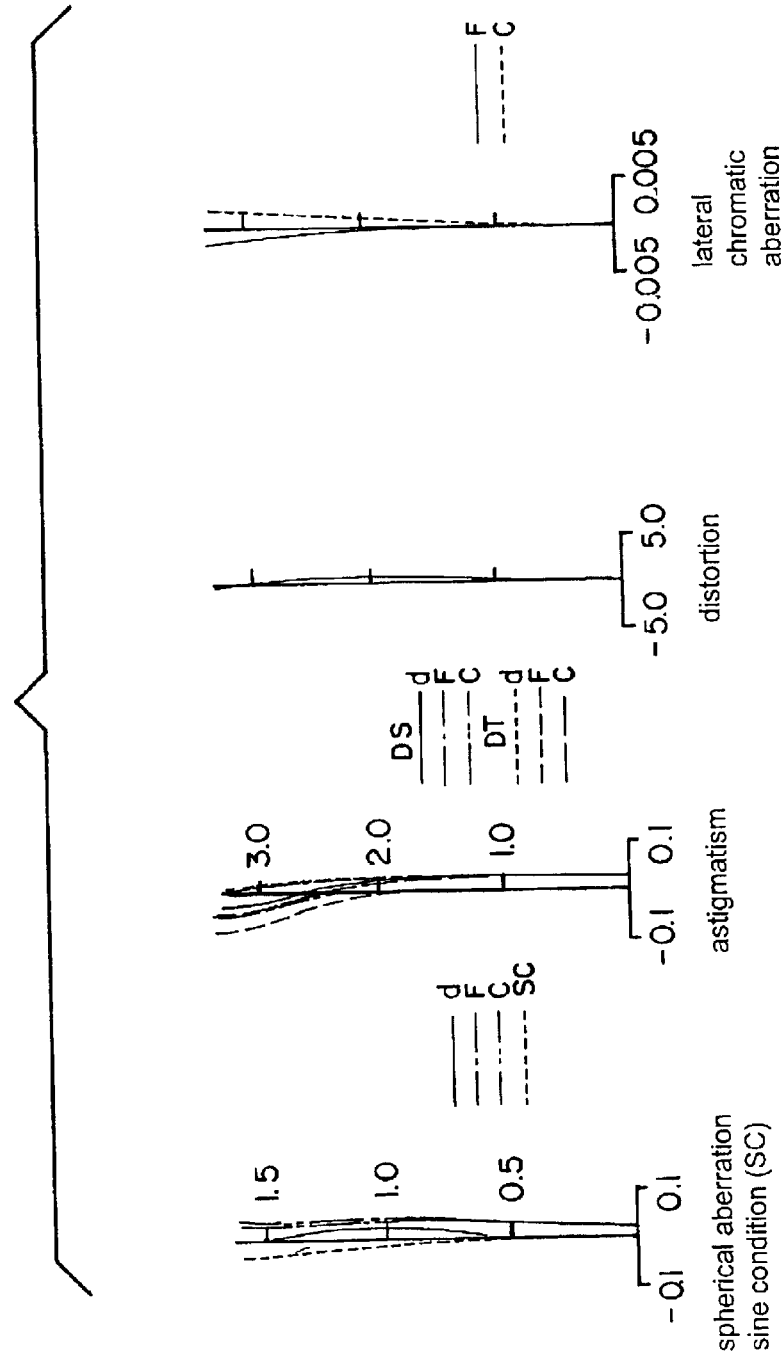
FIG. 12 illustrates spherical aberration, astigmatism, distortion, and lateral chromatic aberration at the telescopic end of a zoom lens according to an alternate embodiment of the present invention.

FIGS. 10, 11, and 12 are aberration line drawings indicating spherical aberration, astigmatism, distortion, and lateral chromatic aberration.

TABLE 9

| | | | |
|---|---|---|---|
| Object distance (mm) | ∞ | Thickness of third lens group III (mm) | 2.50 |
| Focal distance (mm) | 5.893 11.440 17.000 | Total thickness of all lens groups (mm) | 14.15 |
| F number | 2.85 4.12 5.27 | Back focus (air conversion) (mm) | 3.479 3.079 3.479 |
| Exit pupil position (mm) | −24.3 +424.6 +41.98 | Angle of view (2ω) | 60.8° 32.4° 22.1° |
| Total lens length (mm) | 32.282 30.312 32.634 | Focal distance f1 (mm) | −14.109 |
| Total lens system length (mm) | 36.340 33.970 36.692 | Focal distance f2 (mm) | 10.638 |
| Thickness of first lens group I (mm) | 5.70 | Focal distance f3 (mm) | 14.085 |
| Thickness of second lens group II (mm) | 5.95 (includes iris) | Focal distance of the lens system at the wide-angle end fw (mm) | 5.893 |

TABLE 10

| Surface | Curvature radius (mm) | Distance (mm) | Refractive Index (d line) | Abbe number |
|---|---|---|---|---|
| S1 | R1: 162.368 | D1: 1.400 | N1: 1.80432 | v1: 40.9 |
| S2 * | R2: 5.683 | | | |
| | | D2: 2.300 | | |
| S3 | R3: 10.056 | D3: 2.000 | N2: 1.84666 | v2: 23.8 |
| S4 | R4: 25.123 | | | |
| | | D4: variable | | |
| S5 | Aperture stop | | | |
| | | D5: 0.600 | | |
| S6 * | R6: 8.809 | D6: 1.800 | N3: 1.51450 | v3: 63.1 |
| S7 | R7: −17.740 | | | |
| | | D7: 0.250 | | |
| S8 | R8: 5.968 | D8: 2.250 | N4: 1.78590 | v4: 43.9 |
| S9 | R9: −11.149 | D9: 0.800 | N5: 1.72825 | v5: 28.3 |
| S10 | R10: 3.348 | | | |
| | | D10: variable | | |
| S11 | R11: 17.042 | D11: 2.500 | N6: 1.58323 | v6: 59.5 |
| S12 * | R12: −15.002 | | | |
| | | D12: variable | | |
| S13 | R13: ∞ | D13: 1.700 | N7: 1.51680 | v7: 64.2 |
| S14 | R14: ∞ | | | |

* aspherical surface

TABLE 11

| Aspherical surface coefficient | Numerical Data |
|---|---|
| | Surface S2 |
| ε | 0.3291658 |
| D | $0.5744836 \times 10^{-4}$ |
| E | $-0.1527527 \times 10^{-5}$ |
| F | $0.1266336 \times 10^{-6}$ |
| G | $-0.3326889 \times 10^{-8}$ |
| | Surface S6 |
| ε | −0.8754729 |
| D | $-0.4108016 \times 10^{-4}$ |
| E | $-0.8628161 \times 10^{-5}$ |
| F | $0.1449087 \times 10^{-5}$ |
| G | $-0.1167419 \times 10^{-6}$ |
| | Surface S12 |
| ε | −3.8631148 |
| D | $-0.4226433 \times 10^{-5}$ |
| E | $-0.3977215 \times 10^{-5}$ |
| F | $-0.1203615 \times 10^{-6}$ |
| G | $0.8336490 \times 10^{-8}$ |

TABLE 12

| | Wide-Angle End | Central Position | Telescopic End |
|---|---|---|---|
| f (mm) | 5.893 (fw) | 11.440 (fm) | 17.000 (ft) |
| D4 (mm) | 13.113 | 4.855 | 1.483 |
| D10 (mm) | 4.318 | 10.607 | 16.300 |
| D12 (mm) | 1.358 | 0.958 | 1.358 |

For the wide-angle, central, and telescopic positions of the lens system in this third embodiment described above, the total lens length (from the front surface S1 of the first lens 1 to the back surface S12 of the sixth lens 6) is 32.282 mm, 30.312 mm, and 32.634 mm; the total lens system length (from the front surface S1 of the first lens 1 to the image plane, including the cover glass of the CCD) is 36.340 mm, 33.970 mm, and 36.692 mm; the back focus (air conversion) is 3.479 mm, 3.079 mm, and 3.479 mm; the exit pupil position is −24.3 mm, +424.6 mm, and +41.98 mm; and the F number is 2.85, 4.12, and 5.27.

Figure 13:
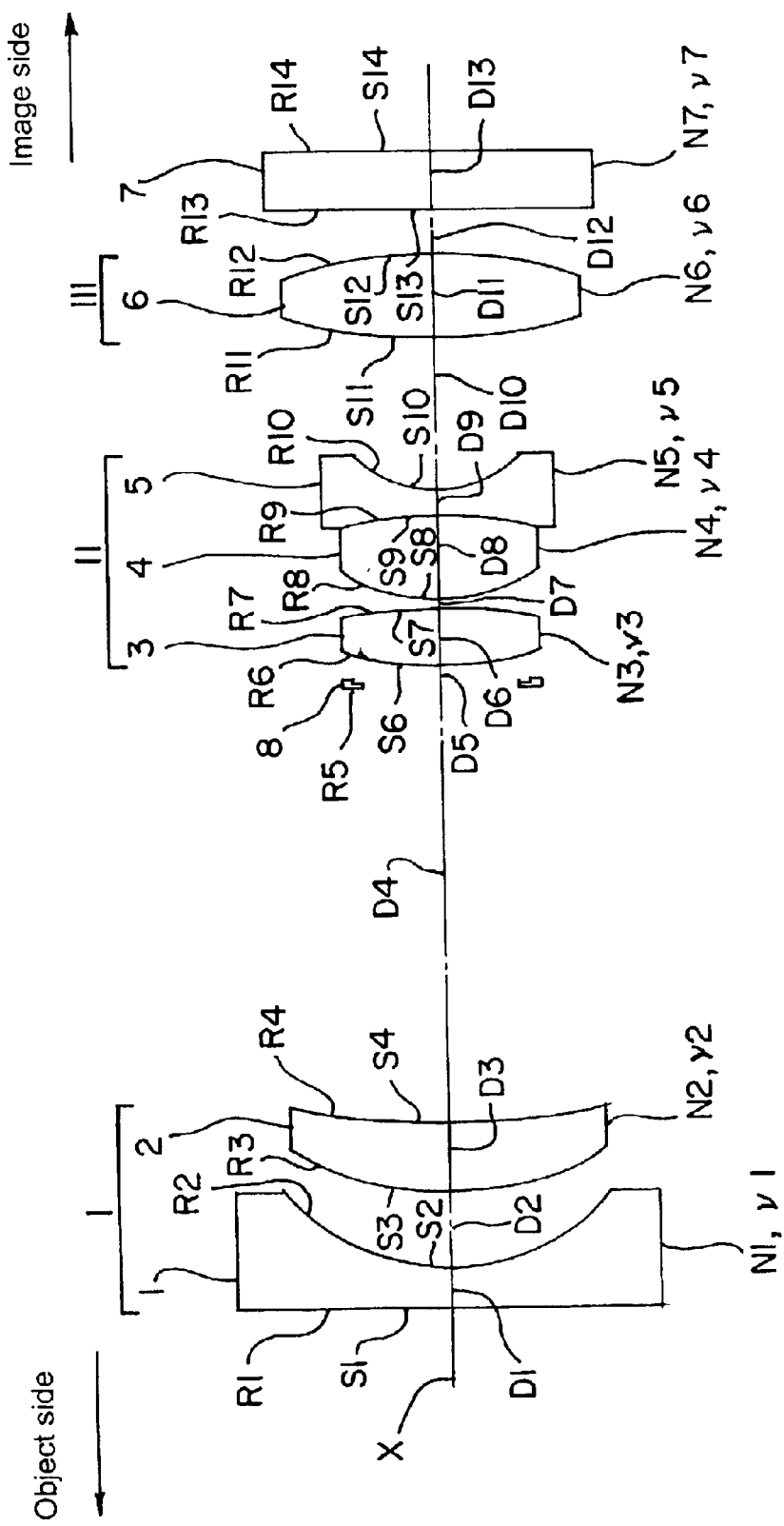
FIG. 13 illustrates an embodiment of a zoom lens according to the present invention.

FIG. 13 shows the basic structure of a fourth embodiment of the zoom lens. The structure of this zoom lens is identical to the structure described above except for the different lens specifications.

Table 13 shows the lens specifications for the fourth embodiment under the conditions (1), (2), (3), and (4), such that $f2/|f1|=0.749$, $f3/fw=2.493$, $v1-v2=17.100$, and $D2/fw=0.407$. Table 14 shows numerical data for the individual lens surfaces. Table 15 shows numerical data relating to the aspherical surfaces. Table 16 shows the focal distances for the lens system at the wide-angle end fw, the central position fm, and the telescopic end ft and the distances D4, D10, and D12 along the optical axis X.

Figure 14:
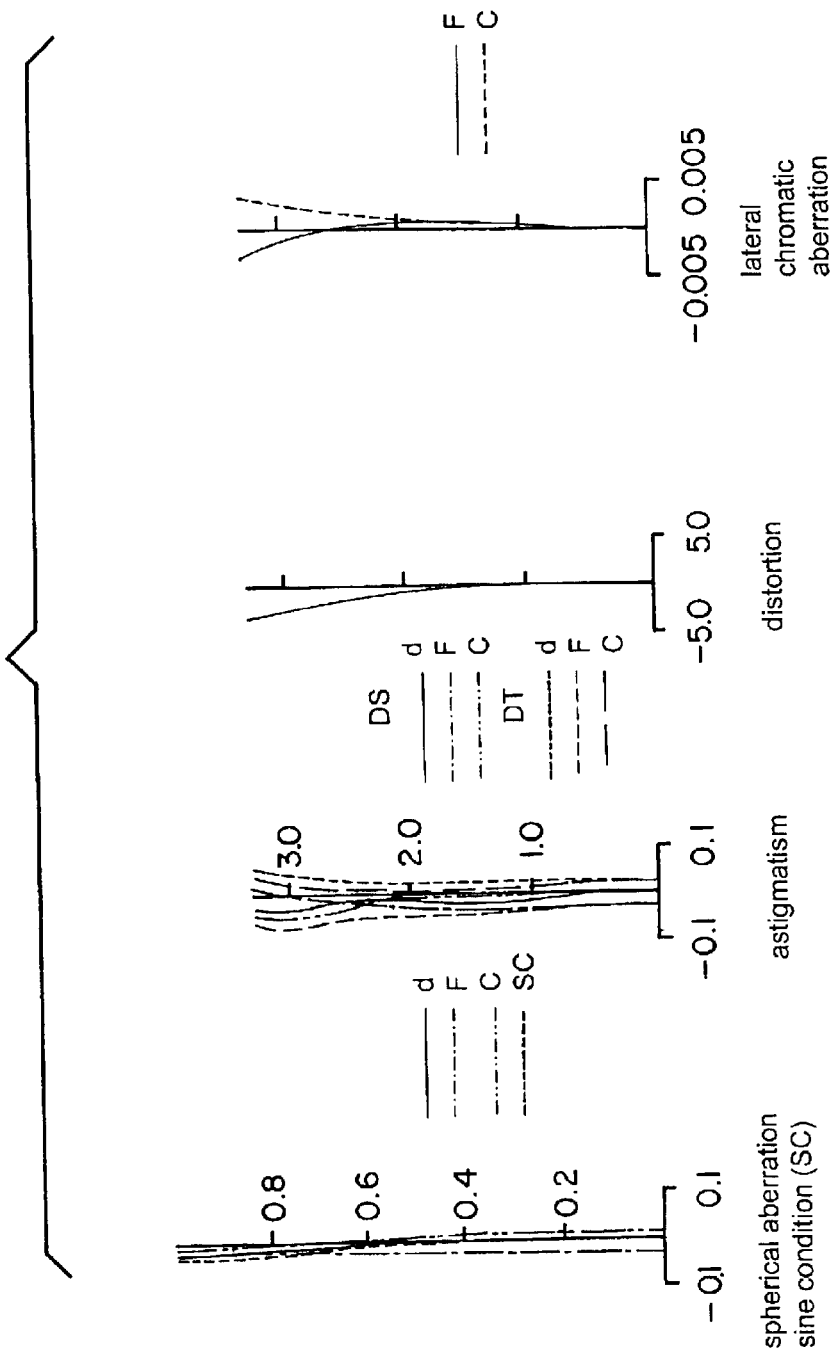
FIG. 14 illustrates spherical aberration, astigmatism, distortion, and lateral chromatic aberration at the wide-angle end of a zoom lens according to an alternate embodiment of the present invention.
Figure 15:
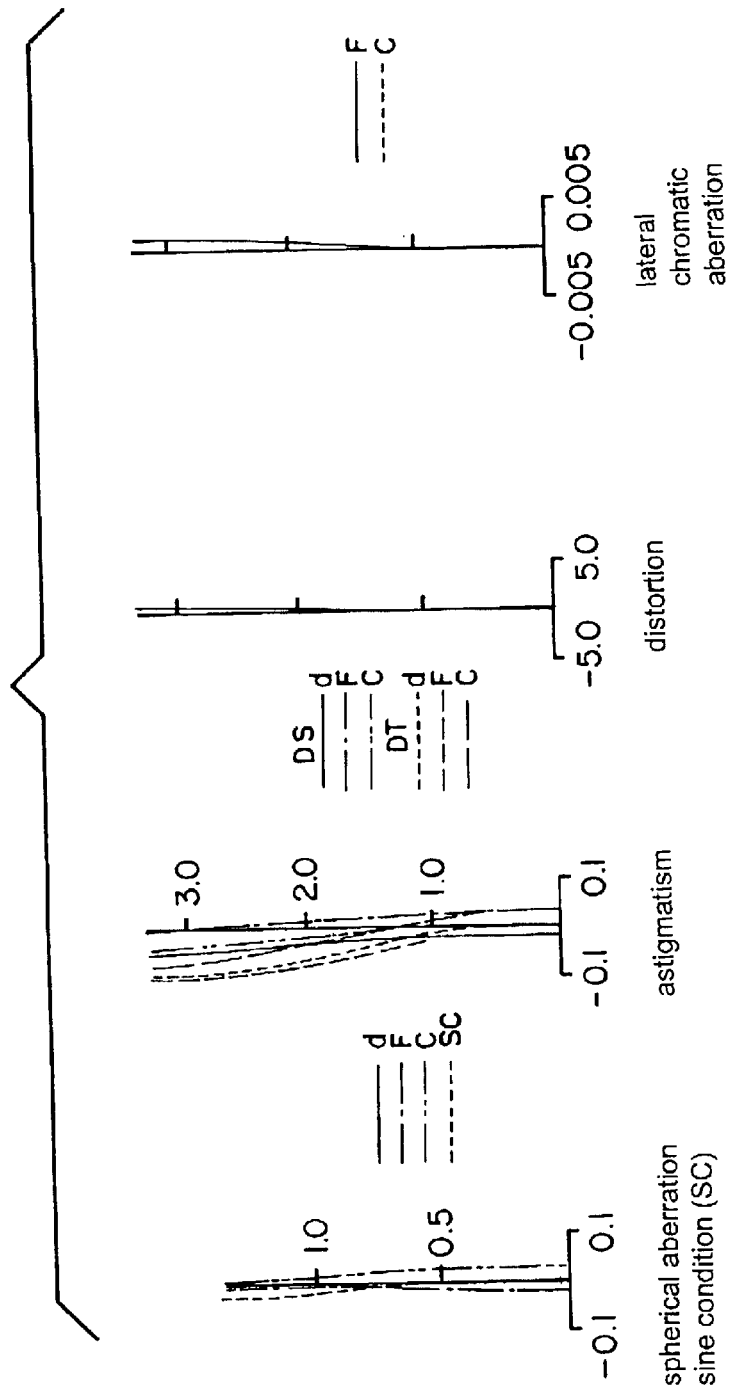
FIG. 15 illustrates spherical aberration, astigmatism, distortion, and lateral chromatic aberration at the central position of a zoom lens according to an alternate embodiment of the present invention.
Figure 16:
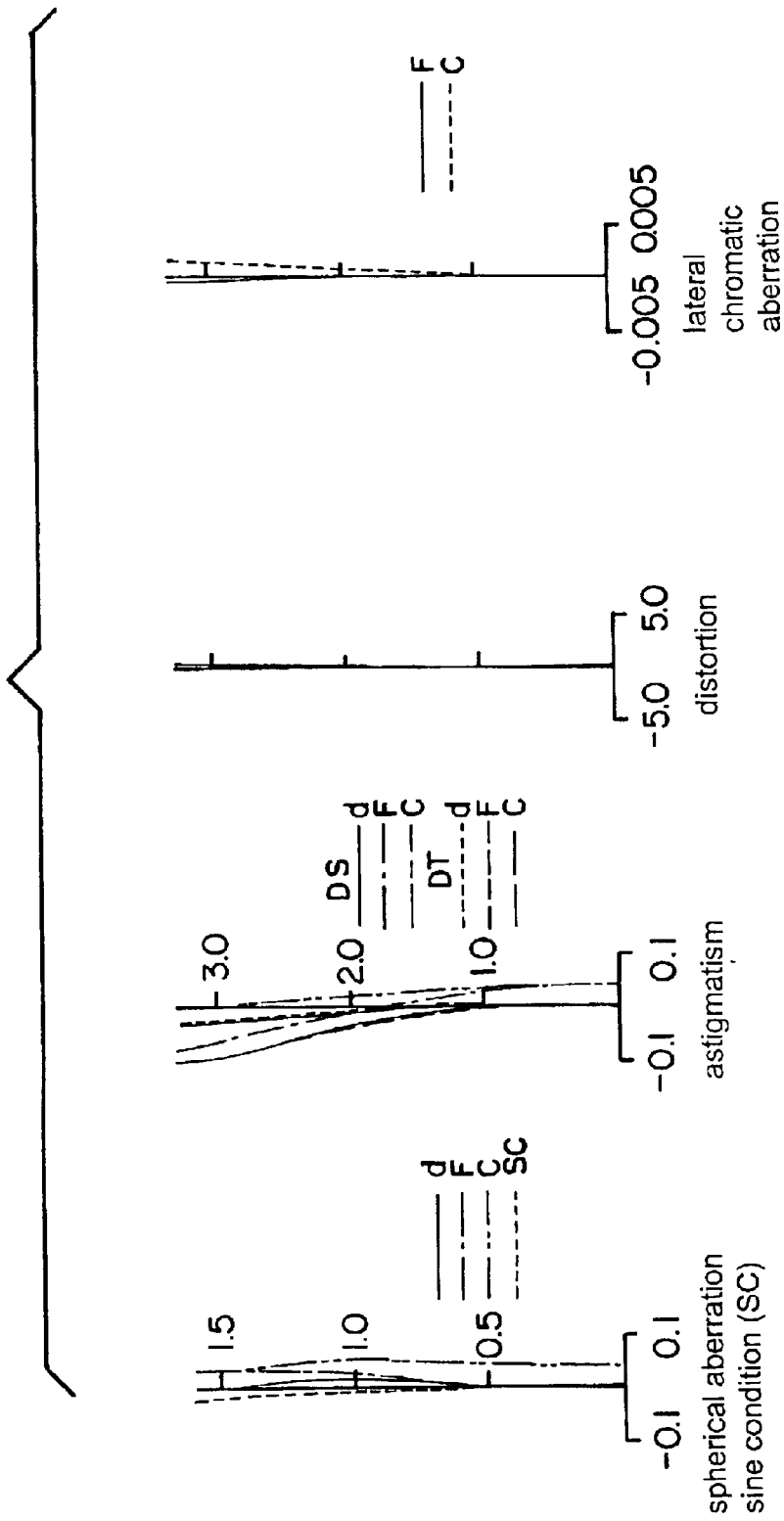
FIG. 16 illustrates spherical aberration, astigmatism, distortion, and lateral chromatic aberration at the telescopic end of a zoom lens according to an alternate embodiment of the present invention.

FIGS. 14, 15, and 16 are aberration line drawings indicating spherical aberration, astigmatism, distortion, and lateral chromatic aberration.

TABLE 13

| Object distance (mm) | ∞ | Thickness of third lens group III (mm) | 2.50 |
|---|---|---|---|
| Focal distance (mm) | 5.650 11.002 16.300 | Total thickness of all lens groups (mm) | 14.15 |
| F number | 2.83 4.04 5.17 | Back focus (air conversion) (mm) | 3.407 3.207 3.407 |
| Exit pupil position (mm) | −21.75 −573.63 +47.73 | Angle of view (2ω) | 62.8° 33.6° 23.0° |
| Total lens length (mm) | 32.312 29.513 31.808 | Focal distance f1 (mm) | −14.184 |
| Total lens system length (mm) | 36.298 33.299 35.794 | Focal distance f2 (mm) | 10.608 |
| Thickness of first lens group I (mm) | 5.70 | Focal distance f3 (mm) | 14.084 |
| Thickness of second lens group II (mm) | 5.95 (includes iris) | Focal distance of the lens system at the wide-angle end fw (mm) | 5.650 |

TABLE 14

| Surface | Curvature radius (mm) | Distance (mm) | Refractive Index (d line) | Abbe number |
|---|---|---|---|---|
| S1 | R1: 111.036 | D1: 1.400 | N1: 1.80432 | ν1: 40.9 |
| S2 * | R2: 5.459 | | | |
| | | D2: 2.300 | | |
| S3 | R3: 10.375 | D3: 2.000 | N2: 1.84666 | ν2: 23.8 |
| S4 | R4: 29.658 | | | |
| | | D4: variable | | |
| S5 | Aperture stop | | | |
| | | D5: 0.600 | | |
| S6 * | R6: 9.954 | D6: 1.800 | N3: 1.60602 | ν3: 57.4 |
| S7 | R7: −22.683 | | | |
| | | D7: 0.250 | | |
| S8 | R8: 6.037 | D8: 2.500 | N4: 1.78590 | ν4: 43.9 |
| S9 | R9: −8.461 | D9: 0.800 | N5: 1.72825 | ν5: 28.3 |
| S10 | R10: 3.364 | | | |
| | | D10: variable | | |
| S11 | R11: 14.100 | D11: 2.500 | N6: 1.60602 | ν6: 57.4 |
| S12 * | R12: −20.181 | | | |
| | | D12: variable | | |
| S13 | R13: ∞ | D13: 1.700 | N7: 1.51680 | ν7: 64.2 |
| S14 | R14: ∞ | | | |

* aspherical surface

TABLE 15

| Aspherical surface coefficient | Numerical Data |
|---|---|
| | Surface S2 |
| ε | −0.22000 |
| D | $0.39183 \times 10^{-3}$ |
| E | $0.67725 \times 10^{-5}$ |
| F | $-0.35091 \times 10^{-6}$ |
| G | $0.68138 \times 10^{-8}$ |

TABLE 15-continued

| Aspherical surface coefficient | Numerical Data |
|---|---|
| | Surface S6 |
| ε | −1.03604 |
| D | $-0.33027 \times 10^{-4}$ |
| E | $-0.55396 \times 10^{-5}$ |
| F | $-0.35091 \times 10^{-6}$ |
| G | $0.68138 \times 10^{-8}$ |
| | Surface S12 |
| ε | 0.00000 |
| D | $0.11533 \times 10^{-3}$ |
| E | $-0.85084 \times 10^{-5}$ |
| F | $0.33444 \times 10^{-6}$ |
| G | $-0.41000 \times 10^{-8}$ |

TABLE 16

| | Wide-Angle End | Central Position | Telescopic End |
|---|---|---|---|
| f (mm) | 5.650 (fw) | 11.002 (fm) | 16.300 (ft) |
| D4 (mm) | 13.400 | 4.640 | 1.373 |
| D10 (mm) | 4.103 | 10.064 | 15.625 |
| D12 (mm) | 1.286 | 1.086 | 1.286 |

For the wide-angle, central, and telescopic positions of the lens system in the fourth embodiment described above, the total lens length (from the front surface S1 of the first lens 1 to the back surface S12 of the sixth lens 6) is 32.312 mm, 29.513 mm, and 31.808 mm; the total lens system length (from the front surface S1 of the first lens 1 to the image plane, including the cover glass of the CCD) is 36.298 mm, 33.299 mm, and 35.794 mm; the back focus (air conversion) is 3.407 mm, 3.207 mm, and 3.407 mm; the exit pupil position is −21.75 mm, −573.63 mm, and +47.73 mm; and the F number is 2.83, 4.04, and 5.17.

The zoom lens according to the present invention provides superior optical characteristics, corrects various types of aberration effectively, and is compact, slim, lightweight, and inexpensive to produce.

The zoom lens is effective particularly when the zoom factor is approximately 3 and when coupled with an imaging element with a high pixel count and a high pixel density. The total lens length during shooting should be no more than 37 mm. The total thickness along the optical axis of the lens groups should be no more than 15 mm. The back focus for placement of a low-pass filter and the like should be at least 3 mm. The lens brightness (F number) at the wide-angle end should be approximately 2.8. Furthermore, the distortion should be no more than 5%.

What is claimed is:

1. A zoom lens comprising: from an object side to an image plane side, a first lens group having an overall refractive index that is negatives, a second lens group having an overall refractive index that is positive, and a third lens group having an overall refractive index that is positive;

wherein:
said first lens group comprises a first lens having a negative refractive power and a second lens having a positive refractive power;
said second lens group comprises a third lens having a positive refractive power and a fourth lens and a fifth lens joined together and having a negative refractive power; and said third lens group comprises a sixth lens having a positive refractive power,
wherein $$v1 - v2 > 10 \quad (3)$$

$$D2/fw > 0.2 \quad (4)$$

where v1 is an Abbe number of said first lens, v2 is an Abbe number of said second lens, D2 is a distance between said first lens and said second lens along an optical axis, and fw is a total lens system focal distance at a wide-angle end;

wherein said first lens group, said second lens group, and said third lens group each move along said optical axis during zooming and image plane correction operations from said wide angle end to a telescopic end;

wherein said third lens group first moves along said optical axis toward said image plane side and then moves toward said object side during zooming and image plane correction operations from said wide angle end to said telescopic end.

2. A zoom lens as described in claim 1, wherein $$0.5 < f2/|f1| < 1.2 \quad (1)$$

$$1.5 < f3/fw < 6 \quad (2)$$

where fi (i=1–3) is a focal distance of an i-th lens group and fw is a total lens system focal distance at a wide-angle end.

3. A zoom lens as described in claim 1, wherein said first lens, said third lens, and said sixth lens independently comprise aspherical surfaces.

4. A zoom lens as described in claim 3, wherein said first lens has two ends having different curvature radii and said aspherical surface of said first lens is located at said end of said first lens having the smaller curvature radius.

5. A zoom lens as described in claim 4, wherein said aspherical surface of said first lens is formed with a diminishing refractive index toward the periphery of said first lens.

* * * * *